(12) United States Patent
Miranda Nieto et al.

(10) Patent No.: US 11,034,311 B2
(45) Date of Patent: Jun. 15, 2021

(54) BRACKET ASSEMBLY

(71) Applicant: Ford Global Technologies, LLC, Dearborn, MI (US)

(72) Inventors: Jorge Adolfo Miranda Nieto, Leon (MX); Martín Mauricio Camacho Carrillo, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 16/676,511

(22) Filed: Nov. 7, 2019

(65) Prior Publication Data

US 2021/0138972 A1 May 13, 2021

(51) Int. Cl.
*B60R 13/02* (2006.01)

(52) U.S. Cl.
CPC ...... *B60R 13/0206* (2013.01); *B60R 13/0212* (2013.01)

(58) Field of Classification Search
CPC ............ B60R 13/0212; B60R 13/0206; B60R 2011/008; B60R 2011/0042; B60R 2011/0028; B60R 7/04; B60R 11/00; B60R 2011/001; B60R 2011/0003; B60R 2011/0084; B60R 2011/0085; B60R 2011/0091
USPC ............. 296/37.7, 39.1, 214, 97.9, 210, 200
See application file for complete search history.

(56) References Cited

U.S. PATENT DOCUMENTS

| | | | |
|---|---|---|---|
| 4,893,867 A * | 1/1990 | Hilborn | B60R 11/00 296/214 |
| 5,062,559 A | 11/1991 | Falcoff | |
| 5,825,096 A | 10/1998 | Morimoto et al. | |
| 6,817,643 B2 | 11/2004 | Donovan et al. | |
| 6,824,185 B2 | 11/2004 | Tiesler et al. | |
| 7,651,121 B2 | 1/2010 | Enriquez | |
| 8,046,880 B2 * | 11/2011 | Katoh | F16B 5/0628 24/458 |
| 8,764,891 B1 | 7/2014 | Brown | |
| 8,899,671 B2 | 12/2014 | Huelke | |
| 10,023,127 B2 * | 7/2018 | Arendsen | B60R 7/04 |
| 10,300,863 B1 * | 5/2019 | Vemulapati | B60R 7/04 |
| 2006/0061145 A1 | 3/2006 | Strebe et al. | |

FOREIGN PATENT DOCUMENTS

| | | |
|---|---|---|
| CN | 100564108 C | 12/2009 |
| CN | 104044518 B | 1/2018 |
| DE | 19653431 C2 | 1/2001 |
| DE | 10357997 B4 | 6/2007 |
| DE | 202019100564 U1 | 2/2019 |
| DE | 102005008678 B4 | 4/2019 |
| EP | 0411581 A1 | 2/1991 |
| FR | 2854113 A1 | 10/2004 |

* cited by examiner

*Primary Examiner* — Dennis H Pedder
*Assistant Examiner* — Joyce Eileen Hill
(74) *Attorney, Agent, or Firm* — David Coppiellie; Price Heneveld LLP

(57) ABSTRACT

A bracket assembly comprises a body that includes a base that has a first end and a second end. The bracket assembly further includes a receiving member that is coupled to the first end of the base, and an engagement portion that is defined by the second end of the base. A support is operably coupled to the engagement portion between a raised position and a lowered position, and includes a retention tab that is proximate to the engagement portion.

19 Claims, 15 Drawing Sheets

BRACKET ASSEMBLY

FIELD OF THE INVENTION

The present disclosure generally relates to a bracket assembly for a vehicle. More specifically, the present disclosure relates to a vehicle bracket assembly having a support.

BACKGROUND OF THE INVENTION

Vehicles often have overhead brackets, including braces that prevent movement of the headliner when an occupant presses upon the headliner, for example when reaching for objects in the overhead console or light switches during normal vehicle operation. The brace is typically a fixed piece of the bracket with a fixed height.

SUMMARY OF THE INVENTION

According to at least one aspect of the present disclosure, a bracket assembly for a vehicle includes a base having a first end and a second end. The bracket assembly includes at least one engagement portion that is defined by the second end of the base, and at least one support that is positioned between a ceiling and a roof of the vehicle and proximate to the second end of the base. The at least one support has a snap tab and is hingedly coupled to the at least one engagement portion between a raised position and a lowered position. A receiving member is operably coupled to the snap tab of the at least one support.

According to another aspect of the present disclosure, a bracket assembly for a vehicle comprises a body, a first engagement portion and a second engagement portion that is coupled to the body, and a first support and a second support. The first support and the second support is operably coupled to the first and second engagement portions. The first and second supports each include a retention tab and a snap tab.

According to another aspect of the present disclosure, a bracket assembly comprises a body that includes a base that has a first end and a second end. The bracket assembly further includes a receiving member that is coupled to the first end of the base, and an engagement portion that is defined by the second end of the base. A support is operably coupled to the engagement portion between a raised position and a lowered position, and includes a retention tab that is proximate to the engagement portion.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
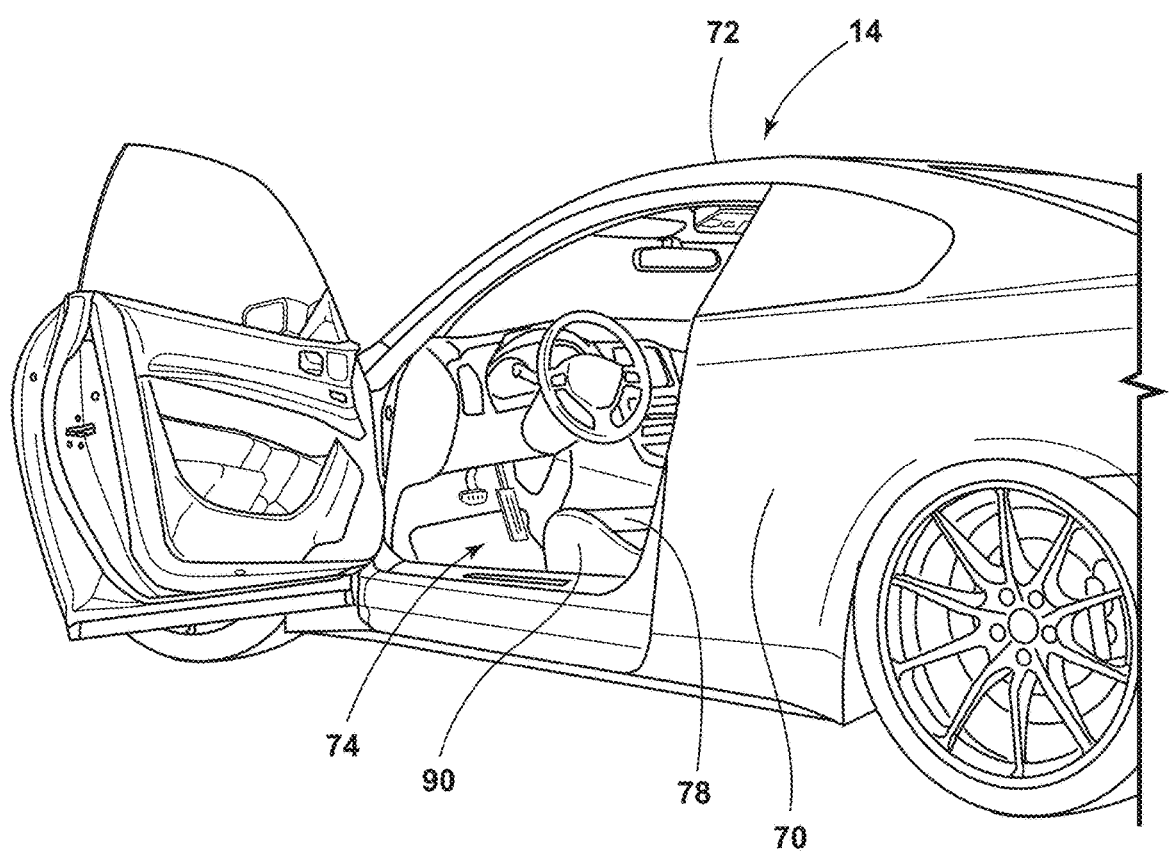
FIG. 1 is a partial side perspective view of a vehicle, according to one example.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring to FIGS. 1-18, reference numeral 10 generally refers to a bracket assembly for a vehicle 14. The bracket assembly 10 includes a base 18 having a first end 22 and a second end 26. At least one engagement portion 30 is defined by the second end 26 of the base 18, and at least one support 34 is positioned proximate to the second end 26 of the base 18. The at least one support 34 has a snap tab 38 and is hingedly coupled to the at least one engagement portion 30 between a raised position 42 and a lowered position 46. A receiving member 50 is operably coupled to the snap tab 38 of the at least one support 34.

Figure 2:
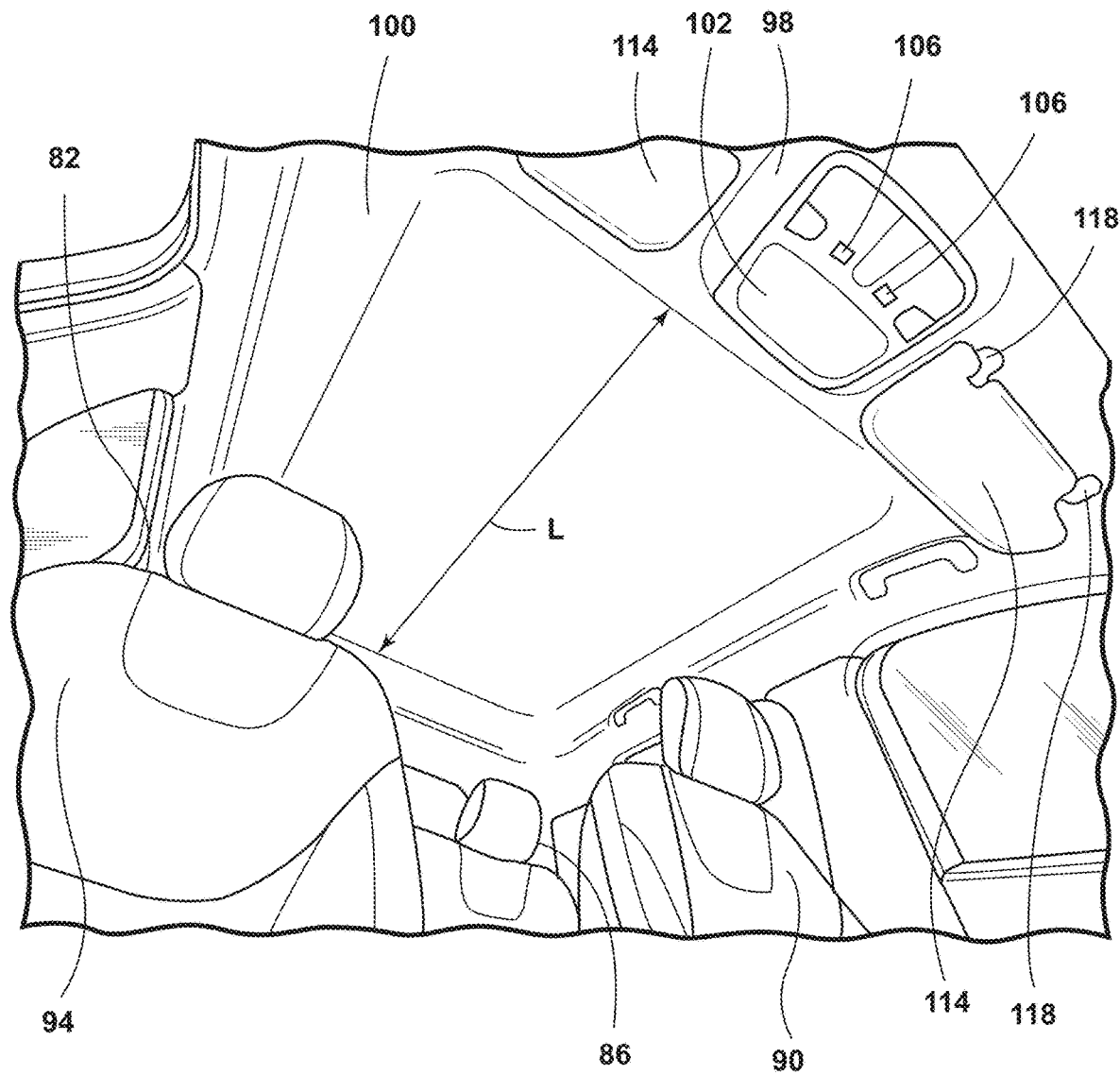
FIG. 2 is a partial bottom perspective view of a ceiling of an interior and passenger compartment of the vehicle, according to one example.
Figure 3:
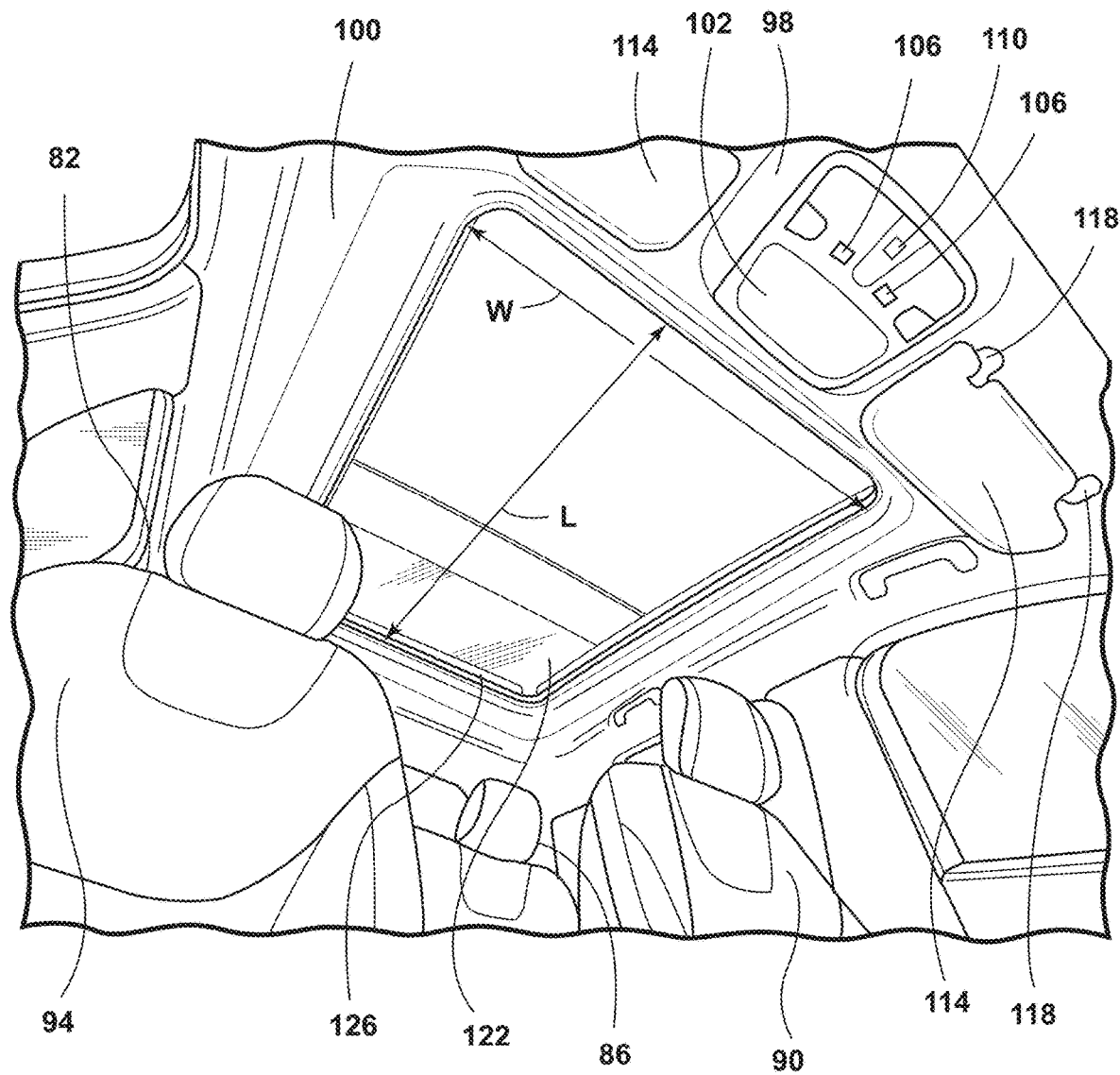
FIG. 3 is a partial bottom perspective view of the ceiling with a transparent portion, according to one example.
Figure 4:
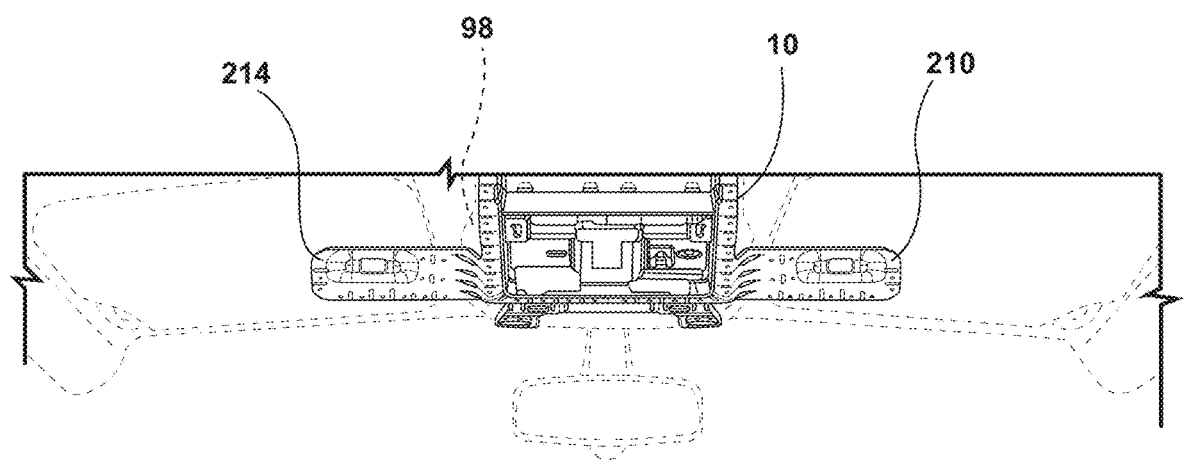
FIG. 4 is a partial rear perspective view of a bracket assembly of the vehicle, according to one example.
Figure 5:
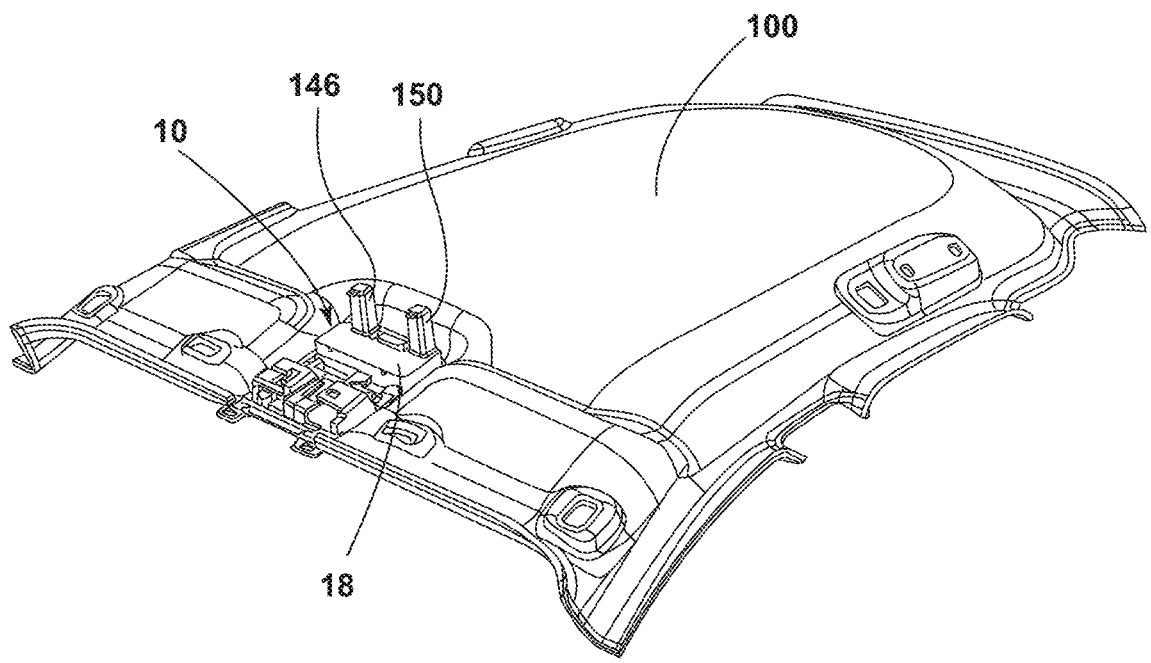
FIG. 5 is a top perspective view of the ceiling of the vehicle including the bracket assembly with supports in a raised position, according to one example.

Referring to FIGS. 1-3, the vehicle 14 includes a vehicle body 70 and a roof 72, which define an interior 74 of the vehicle 14 having a passenger compartment 78 therein. The passenger compartment 78 may include a first seating row 82 and a second seating row 86. Fewer or more seating rows may be included in the vehicle 14 without departing from the teachings herein. The first seating row 82 may include a driver seat 90 and a passenger seat 94. In one example, a headliner 96 may include an overhead console 98, wherein the headliner 96 is formed from a polyurethane or foam material. Additionally or alternatively, the overhead console 98 may be coupled to a ceiling 100 of the vehicle 14 above the driver and passenger seats 90, 94. The ceiling 100 may further define the interior 74 of the vehicle 14, in which the overhead console 98 may be positioned. By way of example, and not limitation, the overhead console 98 may include a storage compartment 102, a plurality of buttons 106, and controls 110. The overhead console 98 may be embedded in the ceiling 100, such that the overhead console 98 appears integrally formed with the ceiling 100. The ceiling 100 and the overhead console 98 are generally rigid with select depressible or movable portions, such as the buttons 106, storage compartment 102, and controls 110. For example, to access the storage compartment 102, an occupant may press upon the storage compartment 102 to release the storage compartment 102 from a stowed position. A visor 114 is coupled to the ceiling 100 via attachment members 118 and may be positioned on either side of the overhead console 98.

While the overhead console 98, as illustrated in FIGS. 2 and 3, is generally positioned between the driver seat 90 and the passenger seat 94 of the first seating row 82, it is contemplated that the overhead console 98 may be positioned in any practicable location within the passenger compartment 78 of the vehicle without departing from the teachings herein. Moreover, the ceiling 100, as illustrated in FIG. 2, is a solid piece such that the ceiling 100 is generally formed from a continuous piece of material that conceals the passenger compartment 78. It is further contemplated, as illustrated in FIG. 3, that the ceiling 100 may include a transparent portion 122. In such depiction, the transparent portion 122 is generally contemplated to be a sunroof, a moon roof, or any other panoramic transparent portion 122 extending along the ceiling 100 visually exposing the passenger compartment 78. Accordingly, it is generally contemplated that the transparent portion 122 is formed from a glass typically used for vehicles and that the transparent portion 122 may be fully transparent, tinted, translucent, or other gradients of transparency used in glass-type substances for vehicles.

The transparent portion 122 may extend a length L of the ceiling 100 or any portion of the length L. It is generally contemplated that the controls 110 are configured to control the opening and closing of the transparent portion 122. It is also contemplated that a shade 126 may be integrated with the ceiling 100 to extend along the ceiling 100 corresponding to the position of the transparent portion 122, such that when the shade 126 is in an extended position the shade 126 may cover the transparent portion 122 of the ceiling 100 relative to the passenger compartment 78. As the shade 126 may generally be retractable and extendable along the ceiling 100, it is generally contemplated that the controls 110 may also be configured to control the shade 126.

In various examples, the vehicle 14 is a wheeled motor vehicle 14, which may be a sedan, a sport utility vehicle, a truck, a van, a crossover, and/or other styles of vehicle. The vehicle 14 may be a manually operated vehicle (e.g., with a human driver), a fully autonomous vehicle (e.g., no human driver), or a partially autonomous vehicle (e.g., may be operated with or without a human driver). Additionally, the vehicle 14 may be utilized for personal and/or commercial purposes, such as ride-providing services (e.g., chauffeuring) and/or ride-sharing services.

Referring now to FIGS. 2, 4, 5, and 7, the roof 72 and the ceiling 100 of the vehicle 14 are illustrated as solid and generally continuous. The overhead console 98 is supported by the bracket assembly 10 illustrated in FIG. 5. It is generally contemplated that the bracket assembly 10 and the overhead console 98 may be positioned vehicle forward. The bracket assembly 10 may provide additional rigidity to the overhead console 98 when the overhead console 98 is depressed by an occupant. The ceiling 100 may be slightly separated from the roof 72 to define a space 140 therebetween, in which the bracket assembly 10 is positioned within the space 140 typically above the overhead console 98. For example, the base 18 of the bracket assembly 10 may define a hollow portion 142 that may receive part of the overhead console 98 and may provide room for, for example, the storage compartment 102 of the overhead console 98. It is generally contemplated that the bracket assembly 10 provides stability for the overhead console 98 so the overhead console 98 and the ceiling 100 are generally rigid upon compression, such as selecting a button 106, by the occupant.

This rigidity is defined by the at least one support 34 engaging with an upper portion 144 of the vehicle 14, such as the roof 72, when the occupant presses against a portion of the overhead console 98. The at least one support 34 may include a first support 146 and a second support 150, such that the first support 146 may be positioned generally toward the passenger seat 94 and the second support 150 may be positioned generally toward the driver seat 90. Thus, the first and second supports 146, 150 may provide rigidity for the overhead console 98 regardless of whether the occupant is in the driver seat 90 or the passenger seat 94. It is also contemplated that the at least one support 34 is a single support 34 that extends along the base 18 of the bracket assembly 10 to provide uniform engagement with the upper portion 144 of the vehicle between, at least, the driver and passenger seats 90, 94. The overhead console 98 may also include a bracing member 154 that engages an interior portion 158 of the base 18, such that when the occupant presses on the overhead console 98 the bracing member 154 may press against the interior portion 158 to provide rigid feedback to the occupant. Accordingly, a force may be applied by the bracing member 154 on the base 18, which may be then transferred to the first and second supports 146, 150 for engagement with the roof 72 or upper portion 144 of the vehicle 14, more generally.

Figure 6:
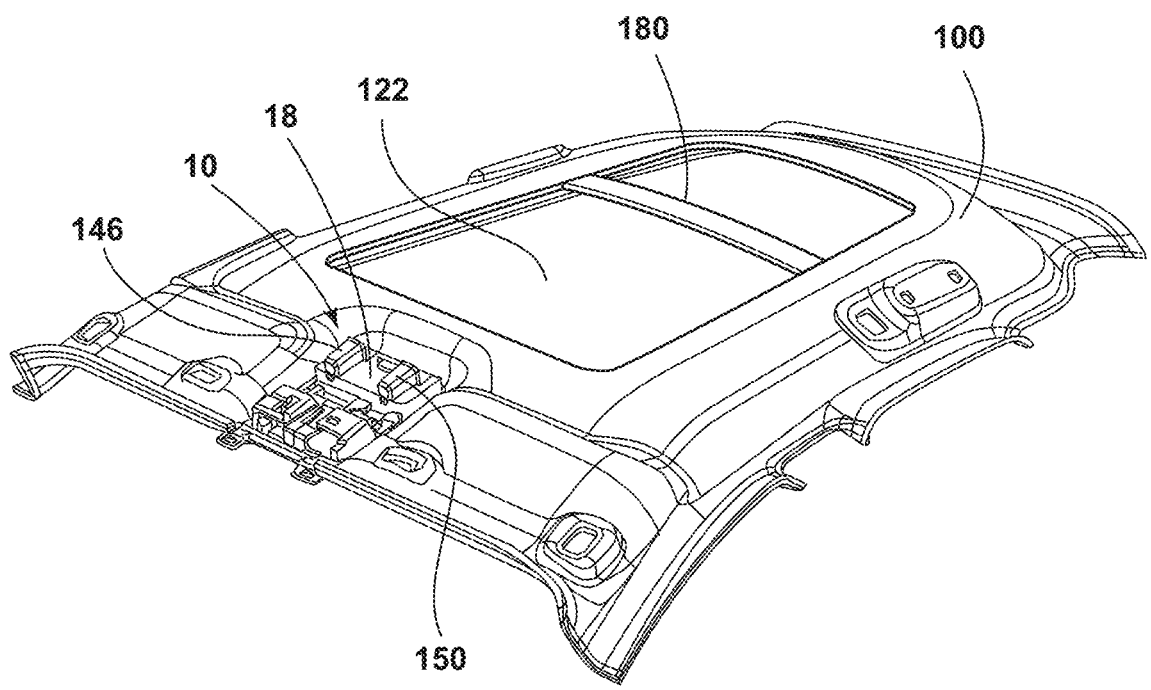
FIG. 6 is a top perspective view of the ceiling of the vehicle with the transparent portion including the bracket assembly with the supports in a lowered position, according to one example.
Figure 7:
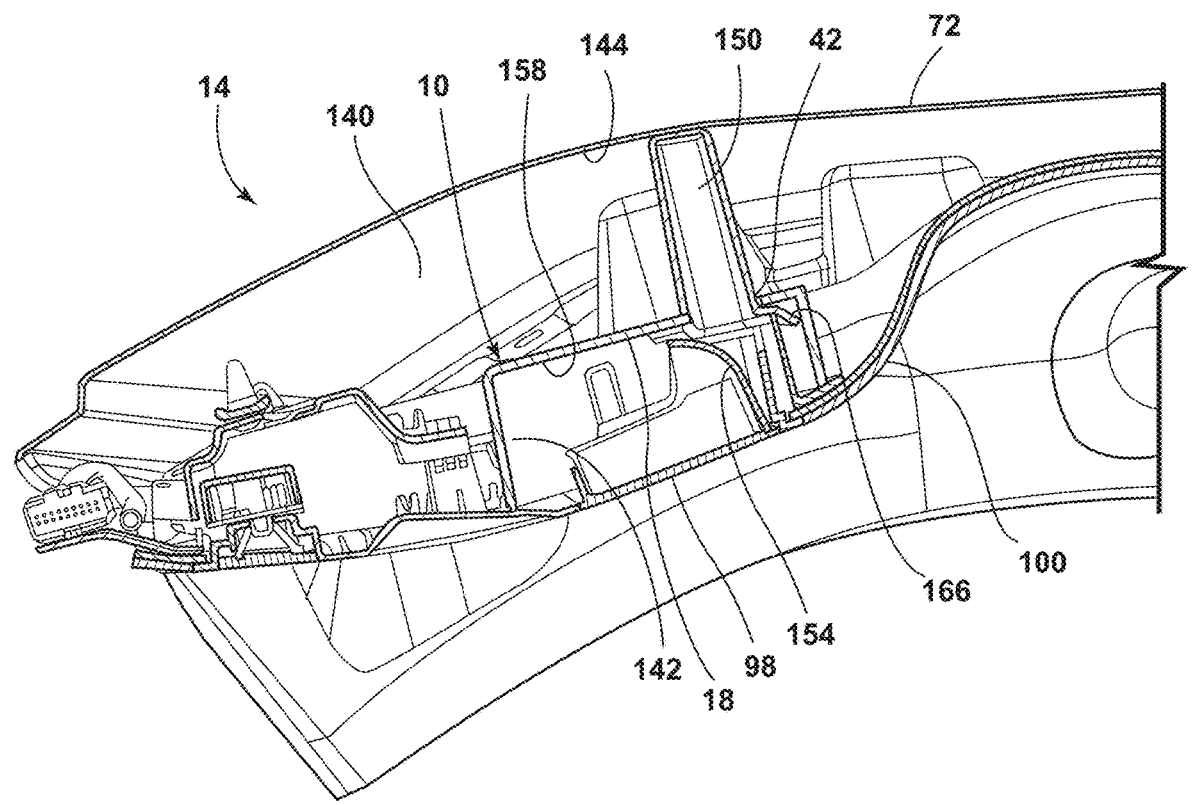
FIG. 7 is a partial cross-sectional view of the bracket assembly positioned between a roof of the vehicle and the ceiling of the vehicle, according to one example.

With further reference to FIGS. 2, 4, 5, and 7, the first and second supports 146, 150 are illustrated in the raised position 42. It is generally contemplated that in such configuration, the space 140 defined between the roof 72 and the ceiling 100 is such that the first and second supports 146, 150 have a greater height 162 (FIG. 9) relative to the base 18 than when the first and second supports 146, 150 are in the lowered position 46 (FIG. 6). The raised position 42 is retained by the engagement between the first and second supports 146, 150 and the roof 72, but is also retained by a retention tab 166 coupled to each of the first and second supports 146, 150. Stated differently, the first and second supports 146, 150 each include a retention tab 166 to help retain the first and second supports 146, 150 in the raised position 42. The retention tab 166 operably couples the at least one support 34 to the at least one engagement portion 30, discussed in further detail below.

Referring now to FIGS. 3, 4, 6, and 8, the roof 72 and the ceiling 100 of the vehicle 14 are illustrated as including the transparent portion 122. As depicted, the transparent portion 122 is in a central position of the roof 72 and ceiling 100. A crossbar 180 may span a width W of the roof 72 and ceiling 100 to provide additional structural reinforcement for the ceiling 100. The transparent portion 122 may be movable, such that the transparent portion 122 may be retracted so as to be at least partially open to the exterior of the vehicle 14. Accordingly, mechanical equipment 182 may be positioned within the space 140 defined between the roof 72 and the ceiling 100. The mechanical equipment 182 is configured to control the opening and closing of the transparent portion 122. A planar portion 186 of the mechanical equipment 182 may be positioned generally above the at least one support 34 and extend along the width W of the ceiling 100.

The first and second supports 146, 150 may engage the planar portion 186 of the mechanical equipment 182 as the upper portion 144 of the vehicle 14 in a similar manner that the first and second supports 146, 150 may engage the roof 72. As depicted, the first and second supports 146, 150 are in the lowered position 46 relative to the base 18. The mechanical equipment 182 occupies the space 140 otherwise available to the first and second supports 146, 150 where the roof 72 is constructed from the solid, continuous material. Accordingly, the first and second supports 146, 150 are hingedly rotated into the lowered position 46 and coupled to the base 18. The occupant may press upon the overhead console 98 and the first and second supports 146, 150 will consequently engage the planar portion 186 of the mechanical equipment 182. It is also contemplated that the planar portion 186 is separate from the mechanical equipment 182, such that the planar portion 186 may be separately installed in the space 140 between the ceiling 100 and the roof 72.

Thus, the occupant may compress the overhead console 98 and the at least one support 34 will engage the planar portion 186, while the bracing member 154 of the overhead console 98 engages the interior portion 158 of the base 18. The bracing member 154 of the overhead console 98 may be generally arcuate to accommodate various constructions of the storage compartment 102 contemplated for use in the overhead console 98. Additionally or alternatively, the bracing member 154 may be generally rectangular, square, triangular, circular, and other shapes known in the art suitable for stabilizing the overhead console 98 within the base 18 of the bracket assembly 10.

Referring to FIGS. 4, 9-10, and 12A, the bracket assembly 10 includes a body 190 that further includes the base 18 and an attachment portion 200. As illustrated, the attachment portion 200 defines a first opening 202 and a second opening 206, which provide attachment points for the bracket assembly 10. The bracket assembly 10 may be coupled to the roof 72 and the ceiling 100 within the space 140 (FIG. 7) by fasteners extending through each of the first and second openings 202, 206. It is also contemplated that the attachment portion 200 may define a single opening or more than two openings depending on the attachment configuration for the bracket assembly 10. The first and second openings 202, 206 may also provide passage for electrical wiring and mechanical hardware that may couple to the overhead console 98. By way of example, and not limitation, electrical wiring may pass through the first and/or second opening 202, 206 to couple to the overhead console 98 providing electrical power to various buttons 106, such as buttons 106 that operate interior lights, and other controls 110, such as power controls for the transparent portion 122, included in the overhead console 98 (FIG. 2).

For additional attachment, the body 190 may further include a first flange 210 and a second flange 214 laterally extending from the body 190 of the bracket assembly 10. The first and second flanges 210, 214 may be coupled to the ceiling 100 from to provide lateral support for the overhead console 98. For example, the first and second flanges 210, 214 are illustrated as generally aligning with the visors 114 coupled to the ceiling 100. Thus, while the body 190 of the bracket assembly 10 may provide a majority of the rigid support for the overhead console 98, the first and second flanges 210, 214 may provide additional structure to maintain the rigidity of the ceiling 100 around the overhead console 98.

The primary source of stability for the overhead console 98 is the at least one support 34 positioned on the first end 22 of the base 18. When the support 34 is in the lowered position 46 the support 34 generally spans a distance D between the first end 22 and the second end 26 of the base 18. The first end of the base 18 is proximate to the attachment portion 200 and defines the receiving member 50. Where there is a first and second support 146, 150 there may also be a first receiving member 218 and a second receiving member 222, respectively, discussed in further detail below.

The second end 26 defines the at least one engagement portion 30, which may include a first engagement portion 226 and a second engagement portion 230. The first and second engagement portions 226, 230 may be further defined by a rim 234 that generally aligns with a bottom portion 238 of each of the first and second supports 146, 150. The rim 234 may be raised to define a peripheral wall 242 upon which the bottom portion 238 of each of the first and second supports 146, 150 rests. Additionally or alternatively, the bottom portion 238 of each of the first and second supports 146, 150 may be positioned within the peripheral wall 242 of the rim 234. In the raised position 42, the first and second supports 146, 150 are coupled to the first and second engagement portions 226, 230, respectively, by respective retention tabs 166.

The retention tabs 166 of each of the first and second supports 146, 150 are configured to couple the first and second supports 146, 150 to the rim 234 of each of the first and second engagement portions 226, 230. The retention tabs 166 may engage the base 18 by extending beneath the first and second engagement portions 226, 230 and retaining the first and second supports 146, 150 on the rim 234 or peripheral wall 242 of each of the first and second engagement portions 226, 230. For example, the retention tab 166 is generally Z-shaped so as to create a ledge that may engage with the rim 234 of the first and second engagement portions 226, 230, respectively. Accordingly, if the first and second supports 146, 150 were to be horizontally strained each retention tab 166 may engage the rim 234 of the respective first and second engagement portions 226, 230 to, at least, minimize pivotal movement of the first and second supports 146, 150.

Referring to FIGS. 9-11 and 13A, the first and second supports 146, 150 are hingedly coupled by a pivot 250 to the first and second engagement portions 226, 230, such that the first and second supports 146, 150 may rotate about the pivot 250 to the lowered position 46. When in the lowered position 46, each of the first and second supports 146, 150 has a lesser height 252 than the greater height 162 of the first and second supports 146, 150 in the raised position 42. In the lowered position 46, the snap tab 38 is inserted in the receiving member 50 to retain the respective first and second supports 146, 150. The receiving member 50 may also include a clasp 254 that engages an edge of the snap tab 38, which secures the snap tab 38 within the receiving member 50.

The clasp 254 may be generally L-shaped so as to press upon the edge of the snap tab 38 to maintain the position of the snap tab 38 within the receiving member 50. The clasp 254 may also have other configurations and constructions to engage the snap tab 38 in the receiving member 50. It is also contemplated that the receiving member 50 may have angled protrusions 258 that may retain the snap tab 38 in the receiving member 50 by compression or pinching of the snap tab 38. For example, the angled protrusions 258 may be narrowly positioned such that the snap tab 38 is generally larger than the gap between the angled protrusions 258. The angled protrusions 258, accordingly, may be resiliently flexible to allow the insertion of the snap tab 38 between the angled protrusions 258 and to engage the snap tab 38 to retain the position. It is also contemplated that the snap tab 38 may further define notches 262 that match the general shape and construction of the angled protrusions 258. The notches 262 may provide a snap-lock feature to minimize vertical movement of the first and second supports 146, 150.

Figure 8:
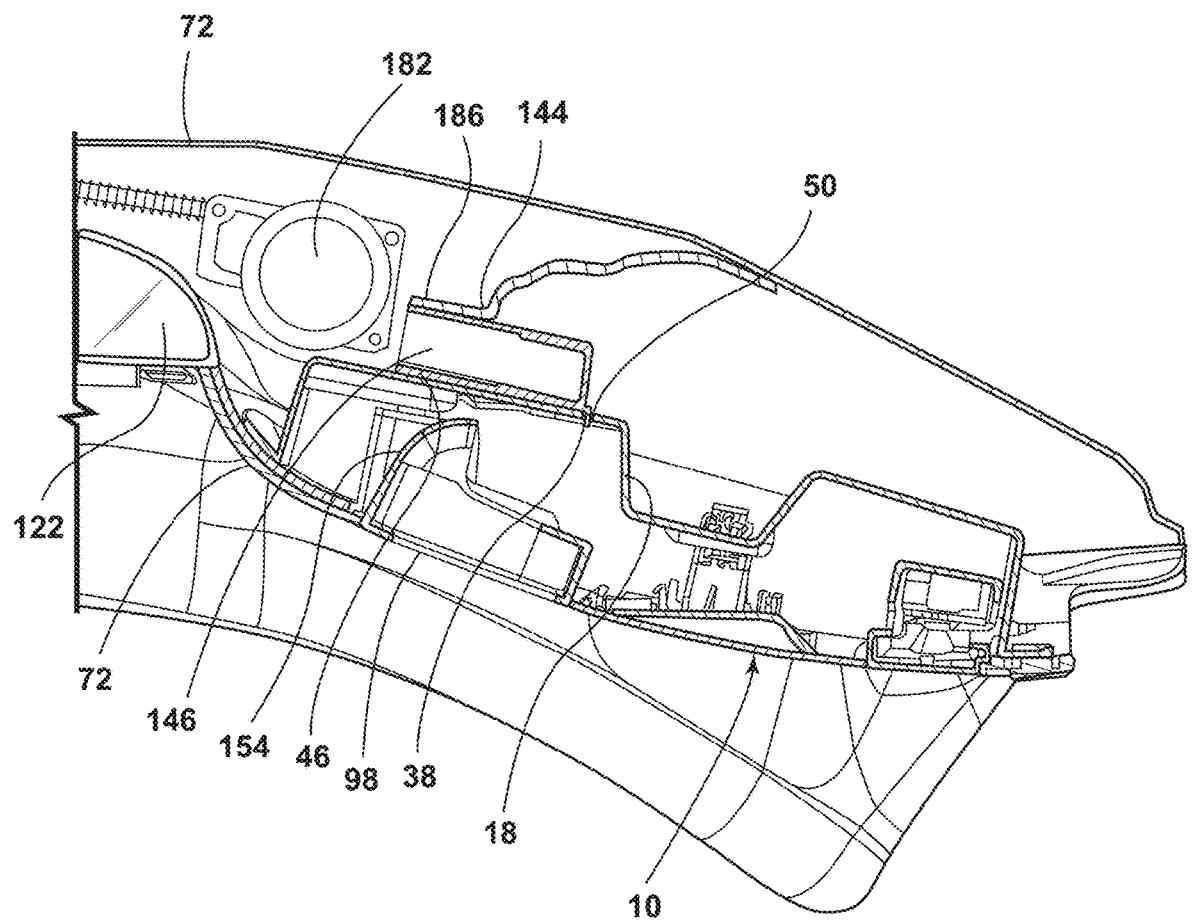
FIG. 8 is a partial cross-sectional view of the bracket assembly positioned between mechanical equipment and the ceiling of the vehicle, according to one example.
Figure 9:
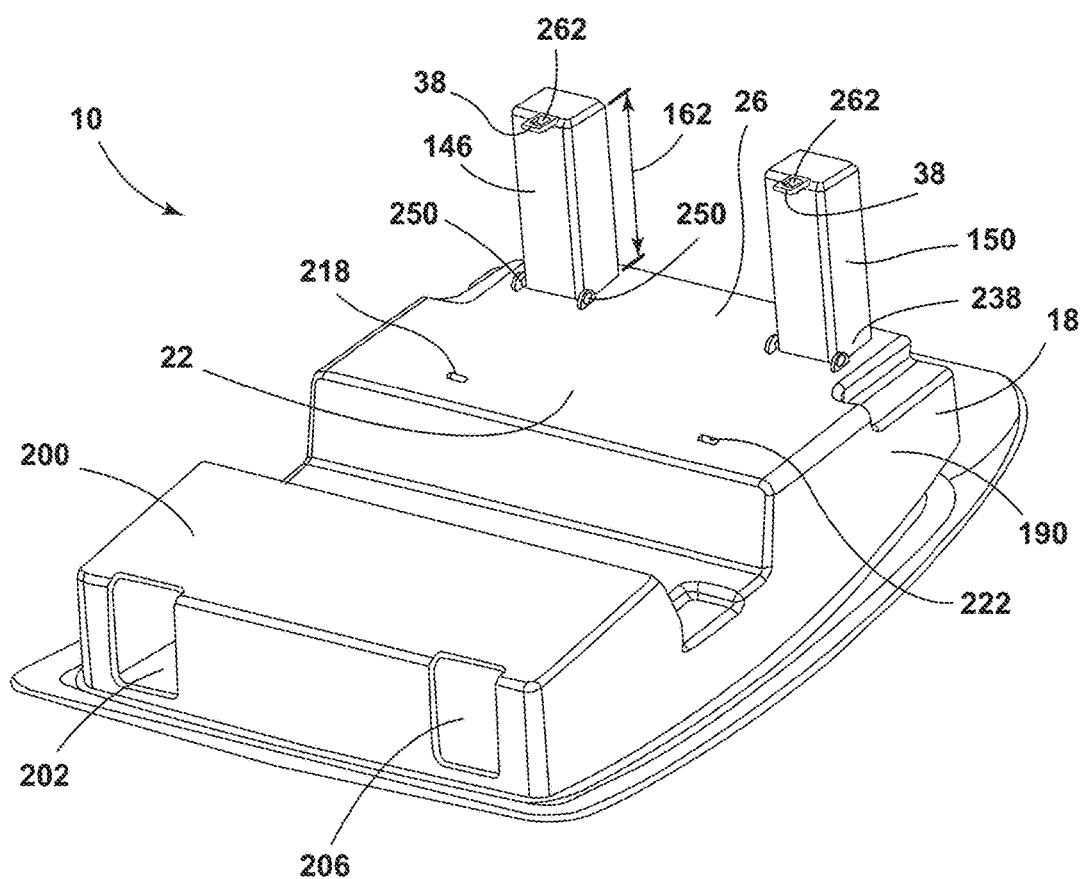
FIG. 9 is a top perspective view of the bracket assembly with the supports in the raised position, according to one example.
Figure 10:
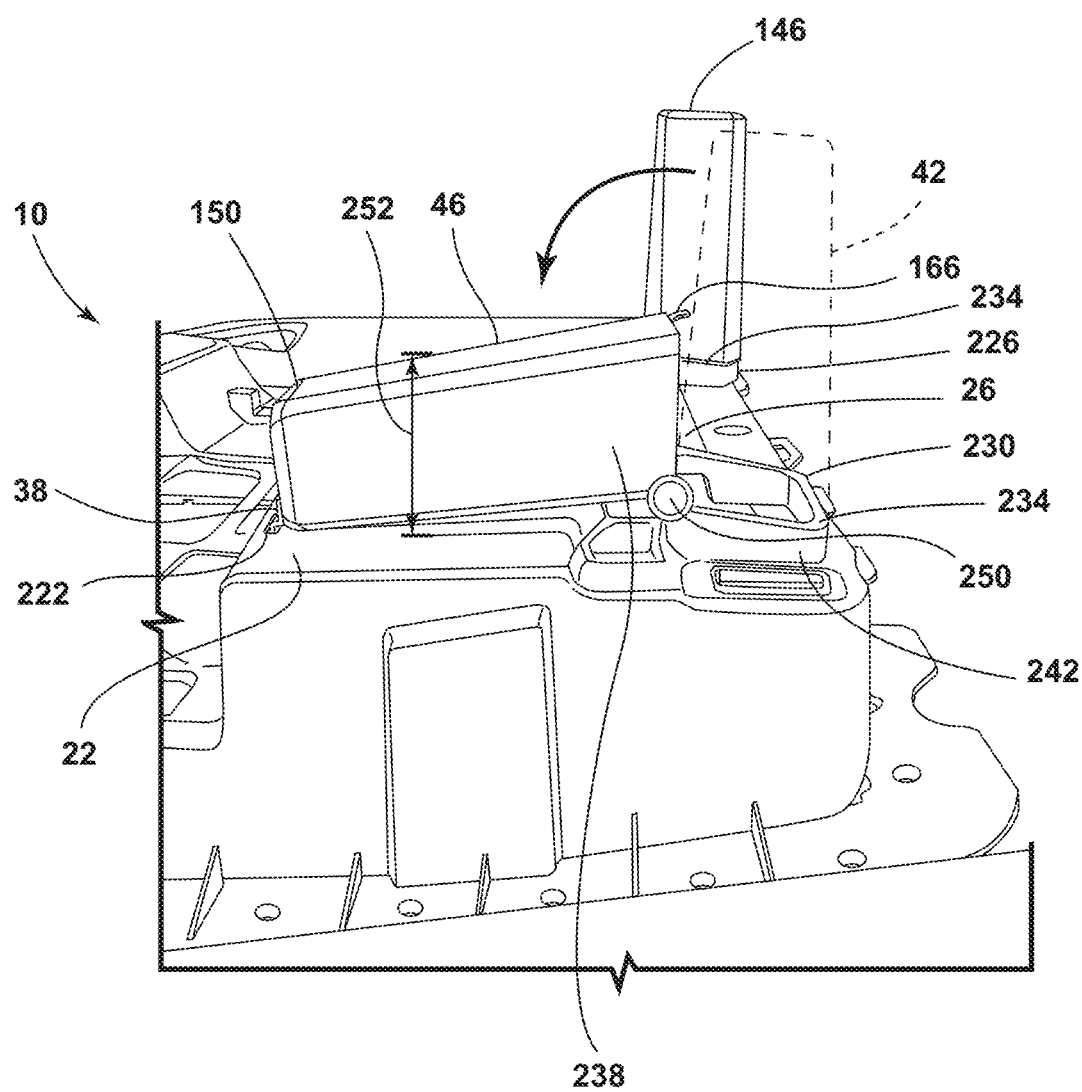
FIG. 10 is a partial side perspective view of the bracket assembly with a first support in the raised position and a second support in the lowered position and with the second support in the raised position in dashed lines, according to one example.
Figure 11:
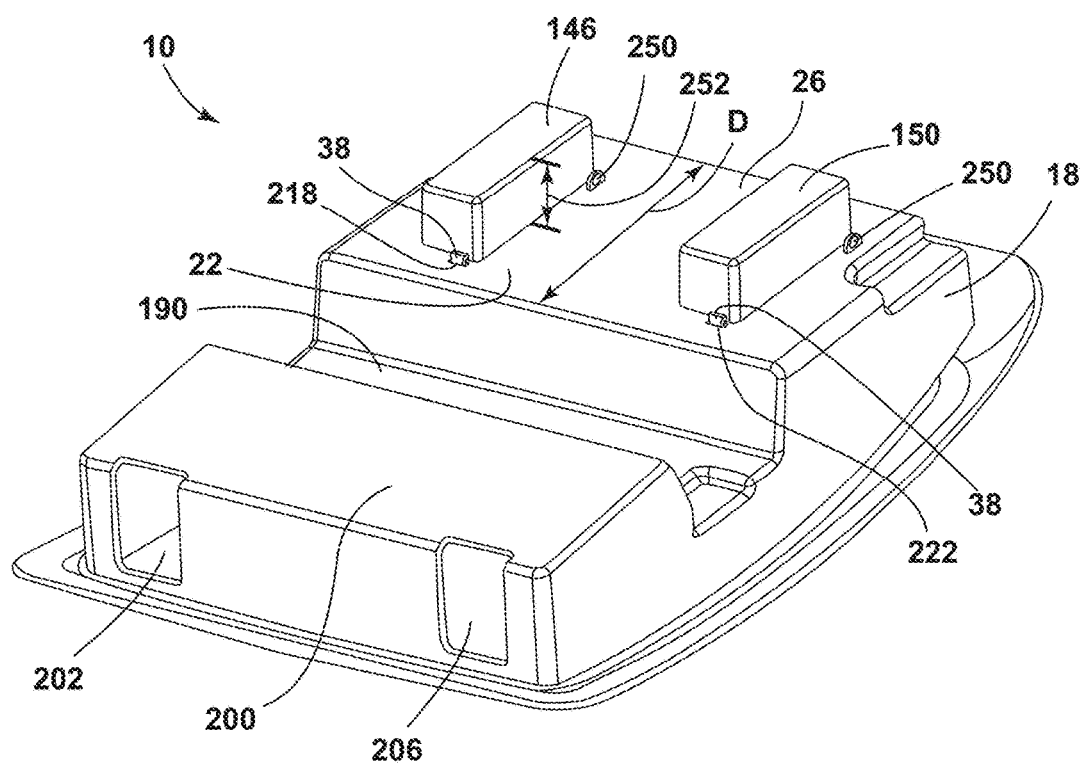
FIG. 11 is a top perspective view of the bracket assembly with the supports in the lowered position, according to one example.

When the first and second supports 146, 150 are in the lowered position 46, the retention tab 166 may contact the upper portion 144 of the vehicle 14 (FIG. 8). It is contemplated that the retention tab 166 may be resiliently flexible such that contact with the upper portion 144 of the vehicle 14 may bend and flex the retention tab 166 with minimal strain (FIG. 8). While resiliently flexible, the retention tab 166 is sufficiently rigid so as to retain the respective first and second supports 146, 150 in the raised position 42. Similarly, the snap tab 38 is resiliently flexible, such that when the first and second supports 146, 150 are in the raised position 42 the snap tab 38 is capable of flexing against the upper portion 144 of the vehicle 14 (FIG. 7) while maintaining its structure.

Figure 12A:
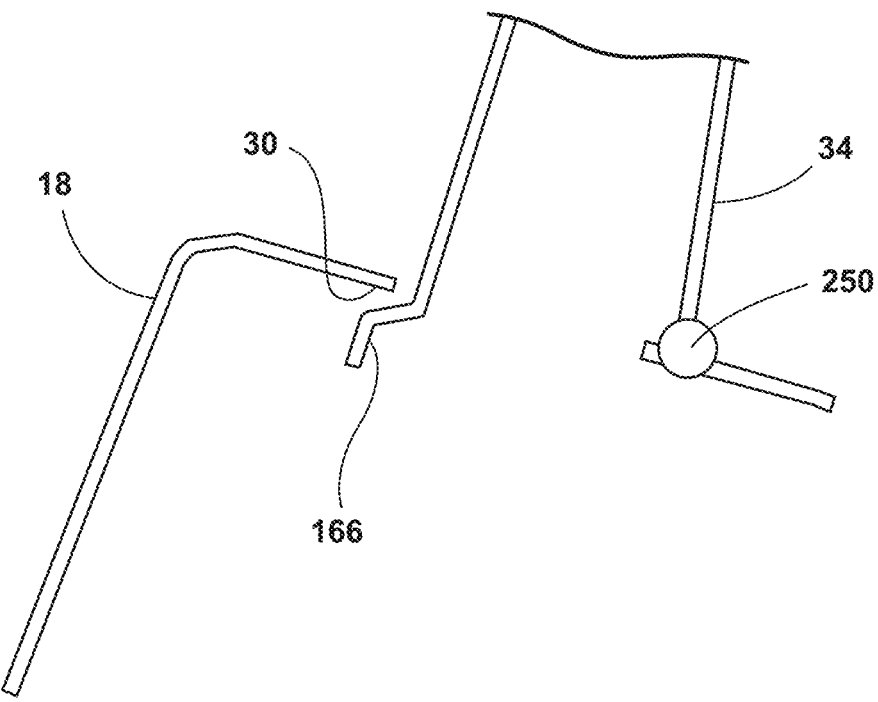
FIG. 12A is a partial schematic view of a base of the bracket assembly and the support coupled to the base by a retention tab, with the support in the raised position, according to one example.
Figure 12B:
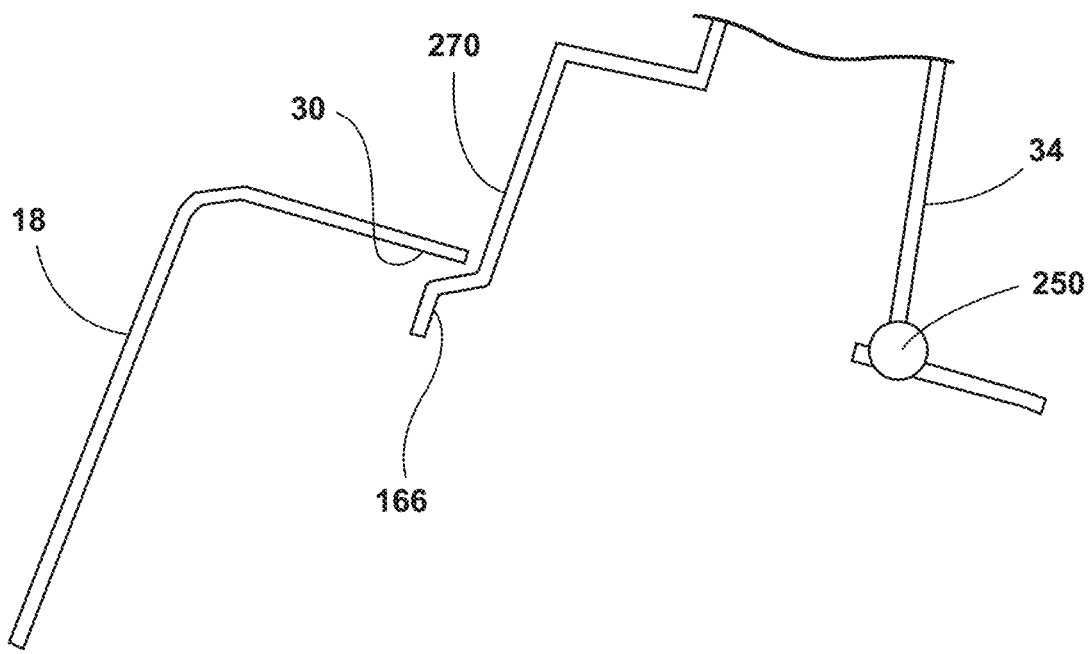
FIG. 12B is a partial schematic view of the base of the bracket assembly and the support with an extension portion, with the support in the raised position, according to one example.
Figure 13A:
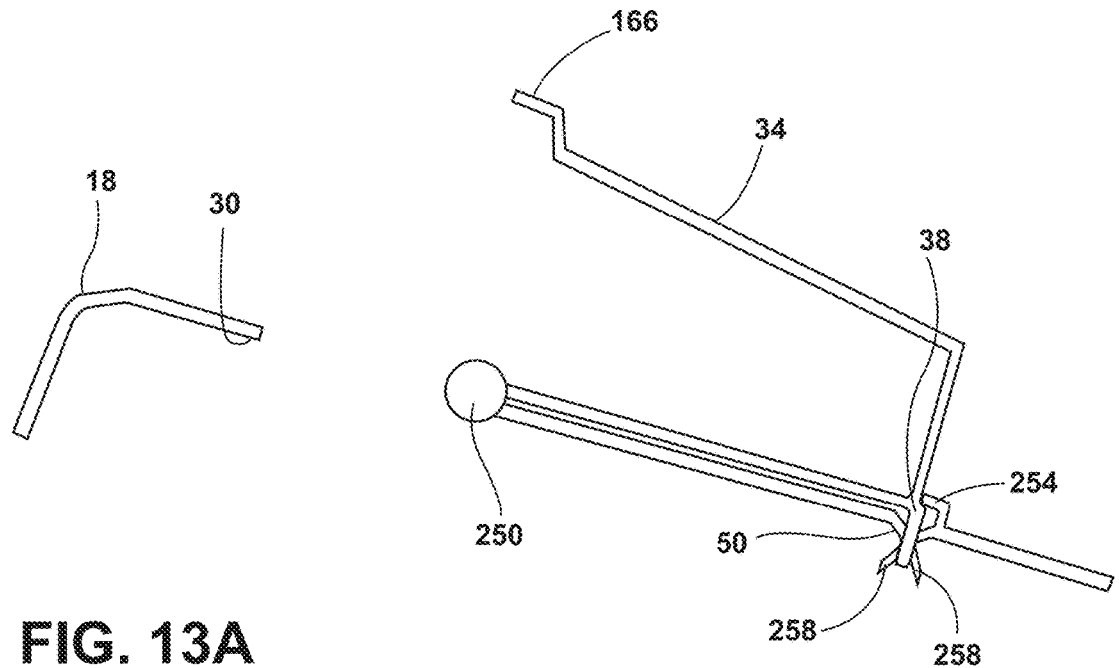
FIG. 13A is a partial schematic view of the base of the bracket assembly and the support with a snap tab coupled to a receiving member, with the support in the lowered position, according to one example.
Figure 13B:
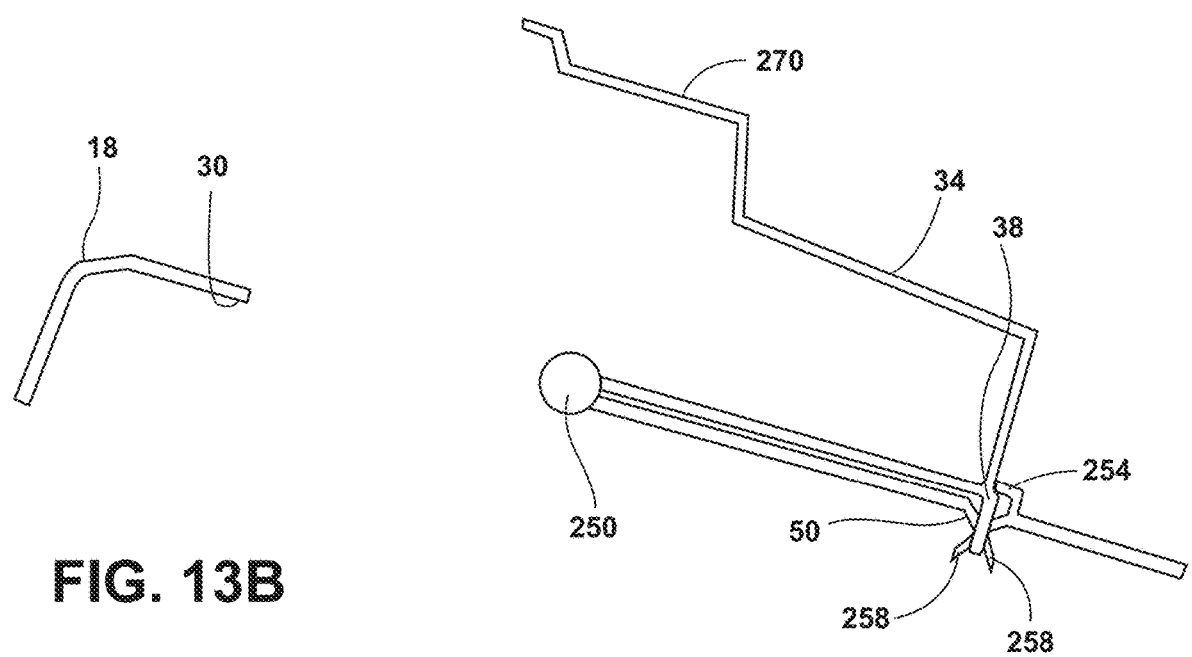
FIG. 13B is a partial schematic view of the base of the bracket assembly and support with the extension portion, with the support in the lowered position, according to one example.
Figure 14:
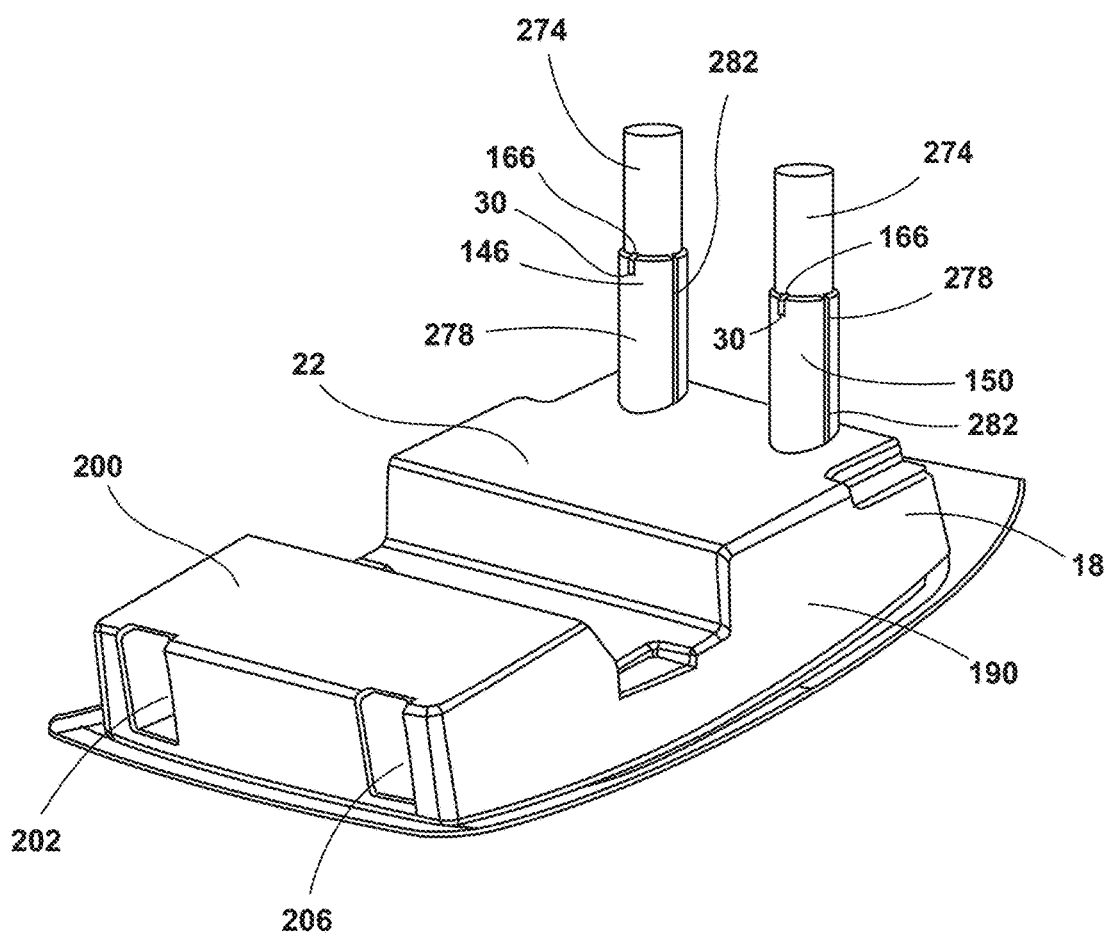
FIG. 14 is a top perspective view of the bracket assembly with the supports in the raised position.
Figure 15:
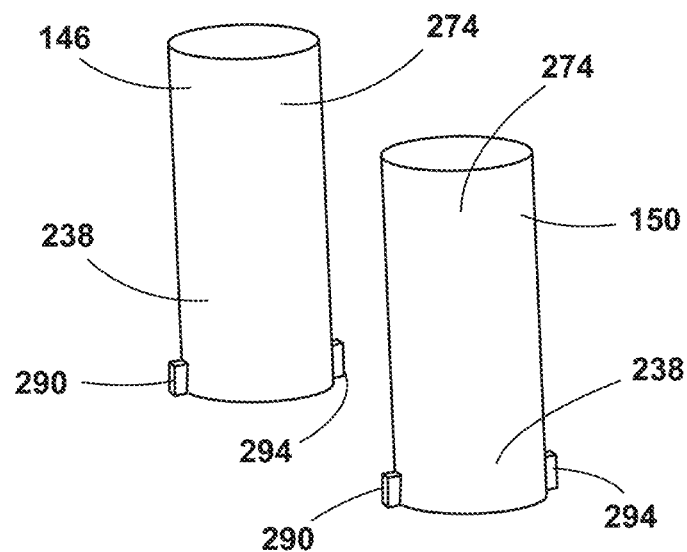
FIG. 15 is a side perspective view of an inner portion of the support defining the retention tab.
Figure 16:
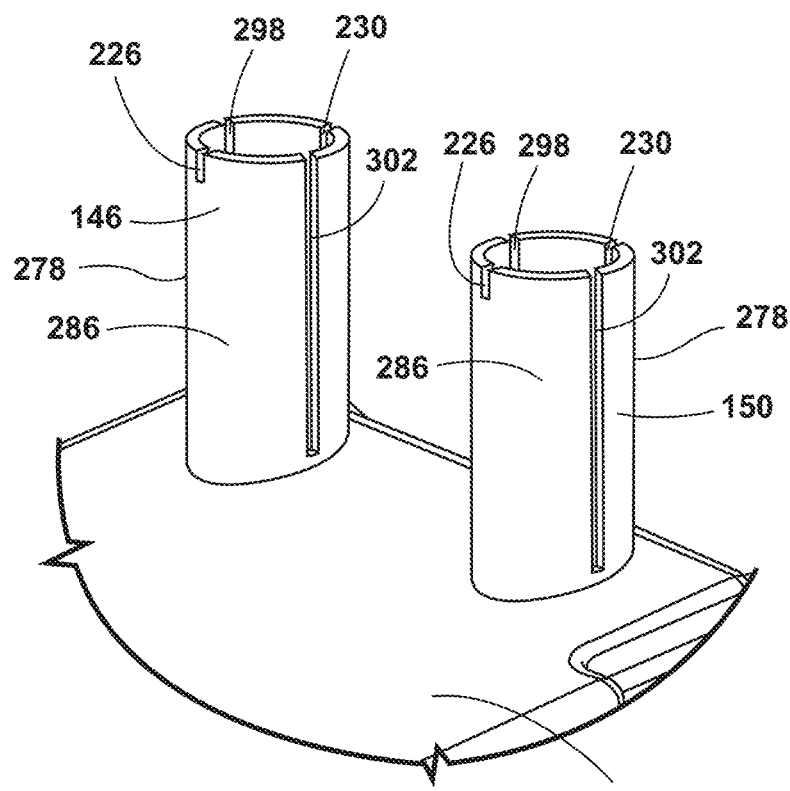
FIG. 16 is a side perspective view of an outer portion of the support defining the engagement portions.
Figure 17:
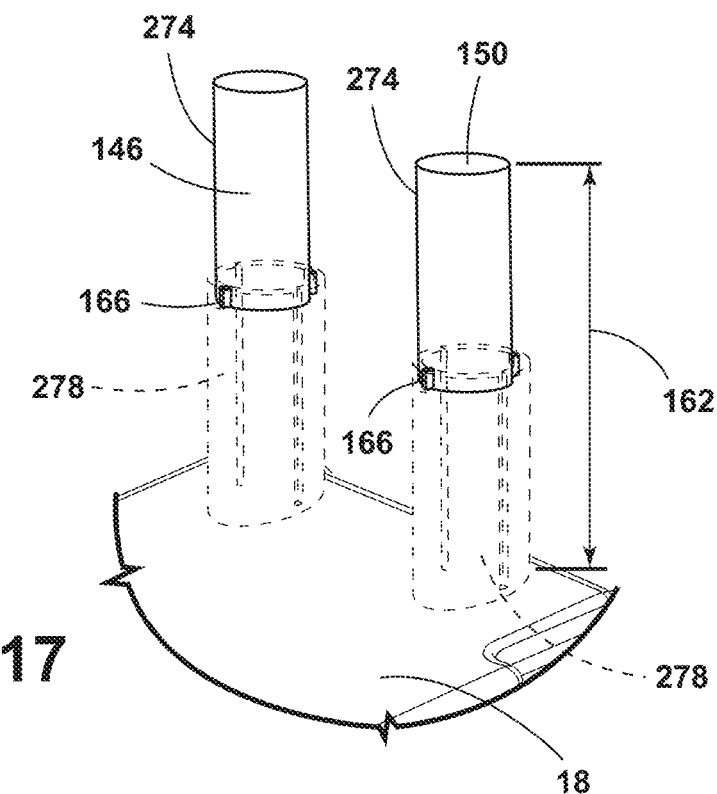
FIG. 17 is a partial expanded side perspective view of the supports in the raised position.
Figure 18:
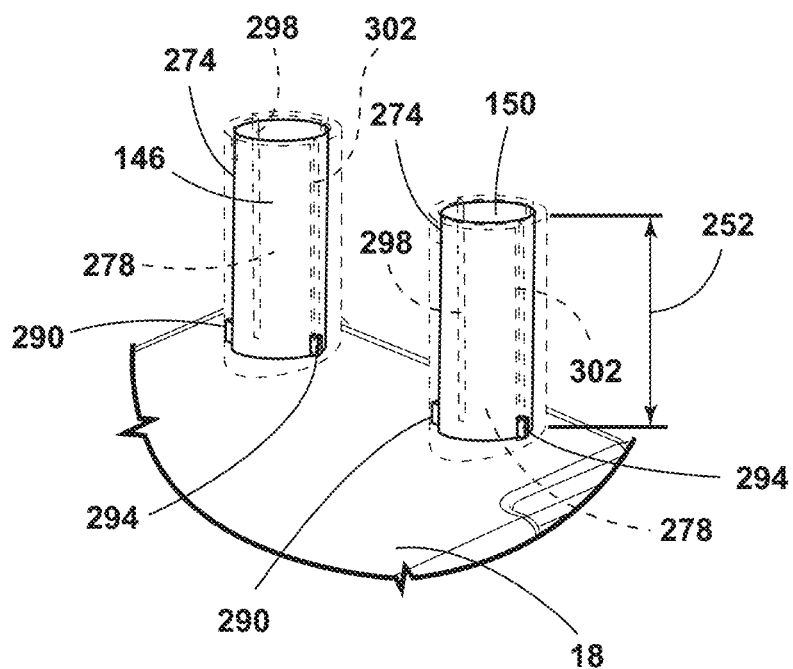
FIG. 18 is a partial expanded side perspective view of the supports in the lowered position.

Referring to FIGS. 12B and 13B, the at least one support 34 may include an extension portion 270, which is primarily advantageous in the lowered position 46 of the support 34. In such configuration, the retention tab 166 extends from the extension portion 270 to couple the support 34 to the at least one engagement portion 30. Additionally, it is generally contemplated that the inclusion of the extension portion 270 may result in a larger bottom portion 238 of the support 34 and, as such, a larger engagement portion 30 as well. The larger engagement portion 30 is configured to accommodate the larger bottom portion 238 of the support 34.

The extension portion 270 is primarily advantageous when the support 34 is in the lowered position 46. When in the lowered position 46, the extension portion 270 provides additional height to the lesser height 252 (FIG. 11) of the support 34 in the lowered position 46. Accordingly, when the contact point between the upper portion 144 of the vehicle 14 (FIG. 8) and the support 34 is intermediate relative to the greater and lesser heights 162, 252 (FIG. 9) of the support 34, the extension portion 270 provides sufficient height to accommodate such a position.

Referring to FIGS. 14-18, the first and second supports 146, 150 may be constructed to be generally cylindrical and may be slidably operable between the raised and lowered positions 42, 46. Accordingly, it is generally contemplated that an inner portion 274 of each of the first and second supports 146, 150 may upwardly extend from an outer portion 278 of each of the first and second supports 146, 150. Such upward extension from the outer portion 278 may similarly resemble a telescoping movement with the inner portion 274 being surrounded by the outer portion 278 in the lowered position 46.

As discussed above, each of the first and second supports 146, 150 defines the lesser height 252 when in the lowered position 46. The lesser height 252 may also correspond to the inner portion 274 being encased by the outer portion 278 of each of the first and second supports 146, 150. When in the lowered position 46, the retention tabs 166 of each of the first and second supports 146, 150 are positioned within a channel 282 defined by a sidewall 286 of each of the first and second supports 146, 150. The channels 282 may minimize circumferential rotation of the first and second supports 146, 150 while in the lowered position 46, such that the retention tabs 166 secure the inner portion 274 within the channels 282. Each of the first and second supports 146, 150 may include a first retention tab 290 and a second retention tab 294. The first and second retention tabs 290, 294 may be positioned in corresponding first and second channels 298, 302 defined by the sidewalls 286 of each of the first and second supports 146, 150.

The first and second retention tabs 290, 294 may slide upward within the first and second channels 298, 302 to be positioned within the first and second engagement portions 226, 230. In an alternative configuration, the first and second engagement portions 226, 230 may be defined by the support 34. Additionally or alternatively, the first and second supports 146, 150 may each have a single retention tab 166. In such configurations, the first engagement portion 226 is defined by the first support 146, and the second engagement portion 230 is defined by the second support 150. As illustrated, the first and second retention tabs 290, 294 are coupled to the first and second engagement portions 226, 230 when the first and second supports 146, 150 are in the raised position 42. Once in the raised position 42, the first and second supports 146, 150 define the greater height 162. The greater height 162 may, therefore, be further defined by the outward extension of the inner portion 274 from the outer portion 278 of each of the first and second supports 146, 150.

The first and second retention tabs 290, 294 may be generally rectangular, square, triangular, or any other shape suitable for coupling to the first and second engagement member 226, 230. The first and second engagement portions 226, 230 are defined as a similar shape construction as the first and second retention tabs 290, 294 so as to securely receive the first and second retention tabs 290, 294, respectively. The first and second retention tabs 290, 294 are defined by the bottom portion 238 of inner portion 274 of the first and second supports 146, 150. Accordingly, a majority of the inner portion 274 of the first and second supports 146, 150 outwardly extends from the outer portion 278 when in the raised position 42.

Referring to FIGS. 1-18, the bracket assembly 10 provides a single apparatus to be used in multiple vehicle types, such as a vehicle 14 with the transparent portion 122 or a vehicle 14 with a solid, continuous roof 72, without having to manufacture customized brackets. The support 34 of the bracket assembly 10 is hingedly rotatable to accommodate a variety of heights between the bracket assembly 10 and the upper portion 144 of the vehicle 14. The use of a single bracket assembly 10 for multiple vehicle 14 constructions may result in cost savings and improved efficiency in manufacturing.

According to various examples, a bracket assembly for a vehicle includes a base having a first end and a second end. The bracket assembly includes at least one engagement portion that is defined by the second end of the base and at least one support that is positioned between a ceiling and a roof of the vehicle and proximate to the second end of the base. The at least one support has a snap tab and is hingedly coupled to the at least one engagement portion between a raised position and a lowered position. A receiving member is operably coupled to the snap tab of the at least one support. Embodiments of the present disclosure may include one or a combination of the following features:

a raised position may define a greater height of an at least one support;
a lowered position may define a lesser height of the at least one support;
an at least one support includes a retention tab;
the retention tab is operably coupled to the at least one support and the at least one engagement portion in the raised position of the at least one support;
at least one support includes a first support and a second support;
at least one engagement portion includes a first engagement portion and a second engagement portion;
the first and second supports are hingedly coupled to the first and second engagement portions;
a receiving member defines a clasp;
a snap tab of the at least one support is retained by the clasp in the lowered position of the at least one support;
at least one support defines an extension that is proximate to the at least one engagement portion;
the extension engages an upper portion of the vehicle in the lowered position of the at least one support; and
at least one support engages an upper portion of the vehicle in either the raised or the lowered position.

According to various examples, a bracket assembly for a vehicle comprises a body, a first engagement portion and a second engagement portion that is coupled to the body, and a first support and a second support. The first support and the second support is operably coupled to the first and second engagement portions. The first and second supports each include a retention tab and a snap tab. Embodiments of the present disclosure may include one or a combination of the following features:

a first support and a second support are hingedly coupled to a first engagement member and a second engagement member;
the first and second supports are operable between a raised position and a lowered position;

a snap tab of each of the first and second support is retained by a first and second receiving member, respectively, in the lowered position of the first and second supports;

the first and second supports are operably coupled to a rim of each of the first and second engagement members;

the first and second supports are disposed within and coupled to the first and second engagement members; and the first and second supports include an extension outwardly extending from the first and second supports.

According to various examples, a bracket assembly comprises a body that includes a base that has a first end and a second end. The bracket assembly further includes a receiving member that is coupled to the first end of the base, and an engagement portion that is defined by the second end of the base. A support is operably coupled to the engagement portion between a raised position and a lowered position, and includes a retention tab that is proximate to the engagement portion. Embodiments of the present disclosure may include one or a combination of the following features:

a support is slidably operable between a raised position and a lowered position relative to a base;

a support includes a snap tab that is operably coupled to a receiving member in a lowered position of the support;

a retention tab is coupled to an engagement portion in a raised position of a support;

a pivot is coupled to a base and is operably coupled to a support, wherein the support rotates about the pivot and defines a raised position and a lowered position; and the support is operably coupled to an upper portion of a vehicle.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A bracket assembly for a vehicle, comprising:
a base having a first end and a second end;
at least one engagement portion defined by the second end of the base;
at least one support positioned between a ceiling and a roof of the vehicle and proximate to the second end of the base, wherein the at least one support has a snap tab and is hingedly coupled to the at least one engagement portion between a raised position and a lowered position; and
a receiving member operably coupled to the snap tab of the at least one support.

2. The bracket assembly of claim 1, wherein the raised position defines a greater height of the at least one support, and wherein the lowered position defines a lesser height of the at least one support.

3. The bracket assembly of claim 1, wherein the at least one support includes a retention tab, and wherein the retention tab operably couples the at least one support to the at least one engagement portion in the raised position of the at least one support.

4. The bracket assembly of claim 3, wherein the at least one support includes a first support and a second support and the at least one engagement portion includes a first engagement portion and a second engagement portion, and further wherein the first and second supports are hingedly coupled to the first and second engagement portions, respectively.

5. The bracket assembly of claim 1, wherein the receiving member defines a clasp, and wherein the snap tab of the at least one support is retained by the clasp in the lowered position of the at least one support.

6. The bracket assembly of claim 1, wherein the at least one support defines an extension proximate to the at least one engagement portion, and wherein the extension engages an upper portion of the vehicle in the lowered position of the at least one support.

7. The bracket assembly of claim 6, wherein the at least one support engages an upper portion of the vehicle in either the raised or lowered positions.

8. A bracket assembly for a vehicle, comprising:
a body configured to be located on the vehicle;
a first engagement portion and a second engagement portion defined by the body;
a first receiving member and a second receiving member coupled to the body; and
a first support and a second support operably coupled to the first and second engagement portions, respectively, wherein the first and second supports each include a retention tab and a snap tab.

9. The bracket assembly of claim 8, wherein the first and second supports are hingedly coupled to the first and second engagement portions, respectively, and wherein the first and second supports are operable between a raised position and a lowered position.

10. The bracket assembly of claim 9, wherein the snap tab of each of the first and second supports is retained by the first and second receiving members, respectively, in the lowered position of the first and second supports.

11. The bracket assembly of claim 9, wherein the retention tab of each of the first and second supports is coupled to the first and second engagement portions, respectively, in the raised position of the first and second supports.

12. The bracket assembly of claim 8, wherein the first and second supports are operably coupled to a rim of each of the first and second engagement portions, respectively.

13. The bracket assembly of claim 8, wherein the first and second supports are disposed within and coupled to the first and second engagement portions, respectively.

14. The bracket assembly of claim 8, wherein each of the first and second supports include an extension outwardly extending from the first and second supports, respectively.

15. A bracket assembly, comprising:
a body including a base that has a first end and a second end;
a receiving member coupled to the first end of the base;
an engagement portion defined by the second end of the base; and
a support operably coupled to the engagement portion between a raised position and a lowered position, wherein the support includes a retention tab proximate to the engagement portion, and wherein the support is operably coupled to an upper portion of a vehicle.

16. The bracket assembly of claim 15, wherein the support is slidably operable between the raised position and the lowered position relative to the base.

17. The bracket assembly of claim 15, wherein the support further includes a snap tab operably coupled to the receiving member in the lowered position of the support.

18. The bracket assembly of claim 15, wherein the retention tab is coupled to the engagement portion in the raised position of the support.

19. The bracket assembly of claim 15, further including a pivot coupled to the base and operably coupled to the support, and wherein the support rotates about the pivot to define the raised position and the lowered position.

* * * * *